(12) United States Patent
Bosco et al.

(10) Patent No.: US 8,934,628 B2
(45) Date of Patent: Jan. 13, 2015

(54) METHOD TO DE-CORRELATE ELECTRIC SIGNALS EMITTED BY AN IC CARD

(75) Inventors: Rosario Bosco, Portici (IT); Vincenzo Pascariello, San Nicola la Strada (IT)

(73) Assignee: STMicroelectronics International NV, Geneva (CH)

(*) Notice: Subject to any disclaimer, the term of this patent is extended or adjusted under 35 U.S.C. 154(b) by 372 days.

(21) Appl. No.: 13/339,859

(22) Filed: Dec. 29, 2011

(65) Prior Publication Data

US 2012/0170742 A1 Jul. 5, 2012

(30) Foreign Application Priority Data

Dec. 30, 2010 (IT) .............................. MI2010A2476

(51) Int. Cl.
G06F 21/00 (2013.01)
G06F 21/60 (2013.01)
G06F 21/55 (2013.01)
G06F 21/72 (2013.01)

(52) U.S. Cl.
CPC ............ *G06F 21/558* (2013.01); *G06F 21/725* (2013.01)
USPC ....................................................... 380/252

(58) Field of Classification Search
CPC ................................ G06F 21/00; G06F 21/60
USPC ........................................................ 380/252
See application file for complete search history.

(56) References Cited

U.S. PATENT DOCUMENTS

| | | | |
|---|---|---|---|
| 6,725,374 B1* | 4/2004 | Jahnich et al. | 713/190 |
| 7,036,002 B1* | 4/2006 | Ugon | 712/228 |
| 2003/0188158 A1* | 10/2003 | Kocher | 713/161 |
| 2004/0260932 A1* | 12/2004 | Blangy et al. | 713/189 |
| 2005/0240782 A1* | 10/2005 | Hubert | 713/300 |
| 2007/0173384 A1* | 7/2007 | Sechrest et al. | 482/99 |
| 2011/0285420 A1* | 11/2011 | Deas et al. | 326/8 |

FOREIGN PATENT DOCUMENTS

| | | |
|---|---|---|
| EP | 1094374 | 4/2001 |
| EP | 1462908 | 9/2004 |

* cited by examiner

*Primary Examiner* — William Powers
(74) *Attorney, Agent, or Firm* — Allen, Dyer, Doppelt, Milbrath & Gilchrist, P.A.

(57) ABSTRACT

A method is to de-correlate electric signals emitted by an IC Card during computations as well as sensitive data involved in such computations. The method includes executing functions introducing respective electric signals which do not involve the sensitive data. Each of the functions is triggered by a timer having a value which is different at each step of executing the functions.

17 Claims, 1 Drawing Sheet

METHOD TO DE-CORRELATE ELECTRIC SIGNALS EMITTED BY AN IC CARD

FIELD OF THE INVENTION

The present invention relates to a method to de-correlate electric signals, emitted by an IC Card during computations.

BACKGROUND OF THE INVENTION

As known, a method to de-correlate electric signals emitted by an IC Card during computations, and sensitive data involved during such computations, provides the execution of one more noise functions. The execution of noise functions introduces electric signals to trick or defeat an attack which attempts to detect sensitive data. In fact the attack cannot distinguish between an electric signal involving the sensitive data and a similar electric signals, i.e. a signal with a same power consumption or frequency, introduced by the noise functions.

FIG. 1 is a diagram representing the electric signals $s_a$, $s_b$, $s_c$ emitted by an IC Card during the computations of instructions $i_1$, $i_2$, $i_3$ as a function of the time t. These computations involve sensitive data, for example a cryptographic key used by instruction $i_2$, to encrypt data. The computation of instruction $i_2$ may generate an electric signal $s_b$ different from the signal emitted by the computations of instructions $i_1$ and $i_3$, due to the computational complexity of the cryptographic instruction with respect to other instructions.

FIG. 2, is another diagram representing the same electrical signals $s_a$, $s_b$, $s_c$ emitted by the IC Card for the computations of the instructions $i_1$, $i_2$, $i_3$, as a function of the time t, with the insertion of further electric signals generated by the computation of noise functions $f_1$, $f_2$, for example between instruction $i_1$, $i_2$. When the IC Card process functions $f_1$, $f_2$, it emits electric signals $s_1$, $s_2$ which are substantially identical to the signal $s_b$ of the instruction $i_2$ involving sensitive data. However, functions $f_1$, $f_2$, does not involve sensitive data. Thus, an attack trying to retrieve sensitive data from the electric signals, should take in considerations not only the signal $s_b$, which is emitted during the effective computation involving sensitive data, but also the similar signals $s_1$, $s_2$, which are de-correlated from such sensitive data.

The bottom part of FIG. 2 schematically represents the implementation of the method to de-correlate electric signals according to the prior art. A timer TMR, for example counting 20 usec, is started. When the timer TMR is decreased to 0, i.e. when the 20 usec are lapsed (as indicated with a in FIG. 2), a noise function $f_1$, $f_2$ may be triggered. Then the timer TMR is reset to count the following 20 usec, after which, at point b of FIG. 2, another noise function $f_1$, $f_2$ may be triggered. In FIG. 2, the timer TMR is reset 8 times (indicated from a to h) and two noise functions $f_1$, $f_2$ are triggered between instruction $i_1$ and $i_2$. In other words, the noise functions $f_1$, $f_2$ may be randomly triggered or not triggered when the timer TMR is reset.

Even if this method is advantageous because it allows the random insertion of noise functions $f_1$, $f_2$, it is limited by the fact that such functions may be inserted only at predetermined times, which are determined by the timer reset. In other words, again with reference to FIG. 2, the functions $f_1$, $f_2$ may be inserted each time the timer TMR is reset, i.e. in each of the points a-h, in one of such points a-h, or in more than one point, for example in a and b, as represented in FIG. 2. However, the noise functions cannot be triggered in a time between the points, for example between a and b.

Thus, an attacker may try to identify all the possible insertion patterns of noise functions triggered by the timer reset and ignore the corresponding electric signals, because they are associated with the noise functions and thus they do not involve the sensitive data.

SUMMARY OF THE INVENTION

An object of the present invention is to avoid detectability of when an electric signal may be introduced by the execution of noise functions to improve the de-correlation of electric signals emitted by an IC Card during computations, and sensitive data involved during such computations, and thus overcoming the limitations that currently affect the prior art.

An of the present invention is to provide a timer for the IC Card having a value which is different at each reset of the timer, and therefore avoiding the determination of insertion patterns of noise functions which are inserted to generate electric signals de-correlated by sensitive data of the IC Card.

According to the approach given above, the present invention includes a method to de-correlate electric signals $s_a$, $s_b$, $s_c$ emitted by an IC Card during computations and sensitive data involved during such computations, the method comprising the step of executing functions introducing respective electric signals $s_1, s_2, \ldots, s_n$ which do not involve the sensitive data. The execution of each of function is triggered by a timer having a value $t_{rand}$ which is different at each execution step.

More particularly, at each timer reset, the functions to be inserted are randomly selected from among a plurality of noise functions stored in the IC Card. According to an aspect, at one or more timer resets during the computation, no noise function is inserted. Advantageously, several executions of the computations involving the sensitive data, forced by an attack, may not be able to identify the insertion patterns of the noise functions introduced for de-correlation, since such functions may be triggered at any time and they do not correspond to an insertion pattern.

Advantageously, the insertion pattern of a noise function after an execution of the entire computation involving the sensitive data is substantially unrepeatable.

At each step of executing the functions, the value $t_{rand}$ of the timer is randomly selected between an upper timer value $t_{upper}$ and a lower timer value $t_{lower}$ which are determined by the IC Card for completing the computation involving sensitive data within a predetermined time limit $t_{max}$. Advantageously, the timer value and thus a number of executions of noise functions within the computation are adaptively processed by the IC Card to comply with standards for IC Card, specifying time limits for the completion of cryptographic computations.

The upper timer value $t_{upper}$ and the lower timer value $t_{lower}$ are associated with an average execution time $t_{pm}$ of portions in which the computations involving sensitive data is divided, i.e. an average execution time $t_{pm}$ of portions of the computations included between two consecutive executions of the noise functions.

More particularly, the average execution time $t_{pmu}$ of the portions in which the computations would be divided setting the timer value $t_{rand}$ to the upper timer value $t_{upper}$ is processed by the IC Card dividing an execution time $t_m$ of the computations for a number $N_1$ of executions of said noise functions. The number N1 allows the completion of the computations in a predetermined time $T_1 > t_m$. This time value T1 is stored inside the IC Card and is lower than the predetermined time limit $t_{max}$. The execution time $t_m$ of the computations, is processed executing the computations without insertion of noise functions and detecting the respective execution time $t_m$.

According to an aspect, the number $N_1$ of executions of the noise functions to complete the computations (together with the insertion of noise functions) in the predetermined time $T_1$ is processed by subtracting, from such predetermined time value $T_1$, the execution time of the computations $t_m$, and dividing the resulting difference with an average execution time $t_f$ of the noise functions. More particularly, the average execution time $t_f$ of the noise functions is stored in the IC Card and is processed by executing each function $f_1 \ldots f_n$, counting the respective execution times and dividing the sum of the execution times for the number of noise functions n.

Advantageously, the average execution time $t_{pmu}$ of the portions, the upper timer value $t_{upper}$ and the number $N_1$ of executions of noise functions are automatically processed by the IC Card, based on the predetermined time value $T_1$, the execution time of the computations $t_m$, and the average execution time $t_f$ of the noise functions is automatically processed by the IC Card.

Similarly, the average execution time $t_{pm1}$ of the portions associated with the lower timer value $t_{lower}$ are processed by dividing the execution time $t_m$ of the computations for a number $N_{max}$ of executions of the noise functions to complete the computations in the predetermined time $T_{max} > t_m$, which $T_{max} > T_1$. $T_{max}$ is stored in the IC Card and complies with standard specifications.

Also the number $N_{max}$ of executions of the noise functions to complete the computations in the predetermined time $T_{max}$ are processed by subtracting, from the predetermined time value $T_{max}$, the execution time of the computations $t_m$, and dividing the resulting difference with the average execution time $t_f$ of the functions. Advantageously, the average execution time $t_{pm1}$ of the portions, the lower timer value $t_{lower}$ and the number $N_{max}$ of executions of noise functions, are automatically processed by the IC Card, based on the predetermined time value $T_{max}$. Also the execution time of the computations $t_m$ and the average execution time $t_f$ of the noise functions are automatically processed by the IC Card.

Thus, given T1 and Tmax, the IC Card may process a range of time values from which selecting different values of the timer, at each timer reset. In a preferred embodiment, the upper timer value $t_{upper}$ is processed with the formula $$t_{upper} = t_{pmu} * f_{clock}$$

and the lower timer value $t_{lower}$ is processed with the formula $$t_{lower} = t_{pm1} * f_{clock}$$

wherein $t_{pmu}$ is the average execution time of the portions associated to the upper timer value, $t_{pm1}$ is the average execution time of the portions associated to the lower timer value and $f_{clock}$ is a frequency of a clock of the IC Card.

According to an aspect of the invention, the clock frequency $f_{clock}$ is a fixed value and the upper timer value $t_{upper}$ and lower timer value $t_{lower}$ are fixed lower and upper bound for the timer. In this respect, as a fixed value of the clock frequency is selected the clock frequency indicated in the datasheet of the chip.

According to another aspect of the invention, the clock frequency $f_{clock}$ is adjusted during the IC Card lifetime, preferably according to the following method. The IC Card requests the handset to receive at least two commands including respective time stamps $t_{s1}$ and $t_{s2}$. At the reception of the first command, the IC Card starts an internal timer. Thus, the IC Card is able to know how many clock cycles $n_{clk1}$ are desired since the receipt of the first command until the internal timer starts; i.e. the timer starts at $T_1 = t_{s1} + t_{e1}$, where $t_{e1} = n_{clk1} / f_{clk}$. The internal timer value $V_1$ at $T_1$ is also known. At the reception of the second command, the IC Card reads the value of the internal timer $V_2$, knowing the number of clock cycles $n_{clk2}$ desired since the receipt of second command until the internal timer is read. By means of the following computation, the IC Card process the average value of its internal clock frequency:

$$f_{clk} = (V_2 - V_1 + n_{clk1} - n_{clk2}) / (t_{s2} - t_{s1})$$

where $$T_1 = t_{s1} + n_{clk1} / f_{clk},$$

$$T_2 = t_{s2} + n_{clk2} / f_{clk},$$

$$T_2 - T_1 = (V_2 - V_1) / f_{clk}$$

$$t_{s2} - t_{s1} + (n_{clk2} - n_{clk1}) / f_{clk} = (V_2 - V_1) / f_{clk}$$

from which $$f_{clk} = (V_2 - V_1 + n_{clk1} - n_{clk2}) / (t_{s2} - t_{s1})$$

This allows adaption, of the upper and lower bound of the timer, for example depending on the processed clock frequency $f_{clk}$ which may decrease due to the usage.

The issues mentioned above are also addressed by an IC Card including circuitry to de-correlate electric signals $s_a$, $s_b$, $s_c$ emitted during computations and sensitive data involved in such computations, comprising functions to be executed for introducing respective electric signals $s_1, s_2, \ldots, s_n$ not involving the sensitive data. The IC Card comprises a timer with a time value $t_{rand}$ which is different for each triggering of the functions.

BRIEF DESCRIPTION OF THE DRAWINGS

Further advantages and features of the method to de-correlate and the corresponding IC Card according to the present invention will be apparent from the following description and the drawings give only for exemplificative purpose and without limiting the scope of the present invention.

DETAILED DESCRIPTION OF THE PREFERRED EMBODIMENTS

Figure 1:
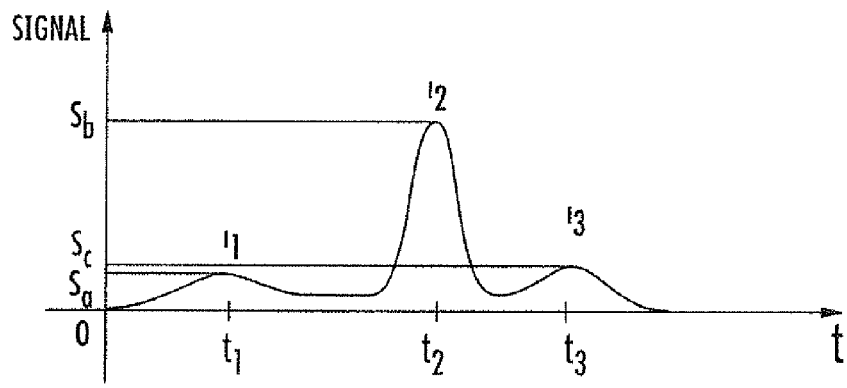
FIG. 1 represents a diagram of the electric signals, emitted by an IC Card during computation, as a function of time, according to the method of the prior art.
Figure 2:
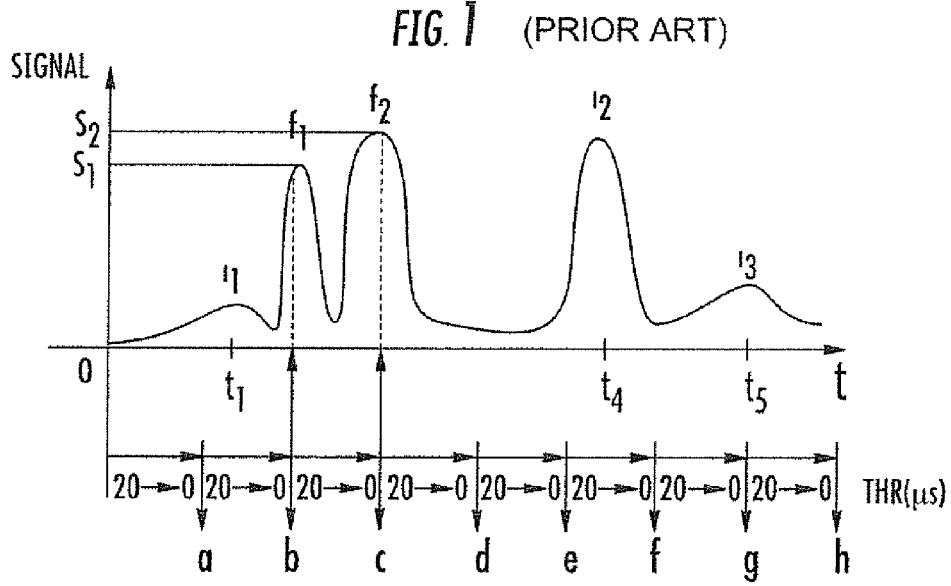
FIG. 2 represents a diagram with the electric signals of FIG. 1 and further electric signals introduced by noise functions, according to the method of the prior art.
Figure 3:
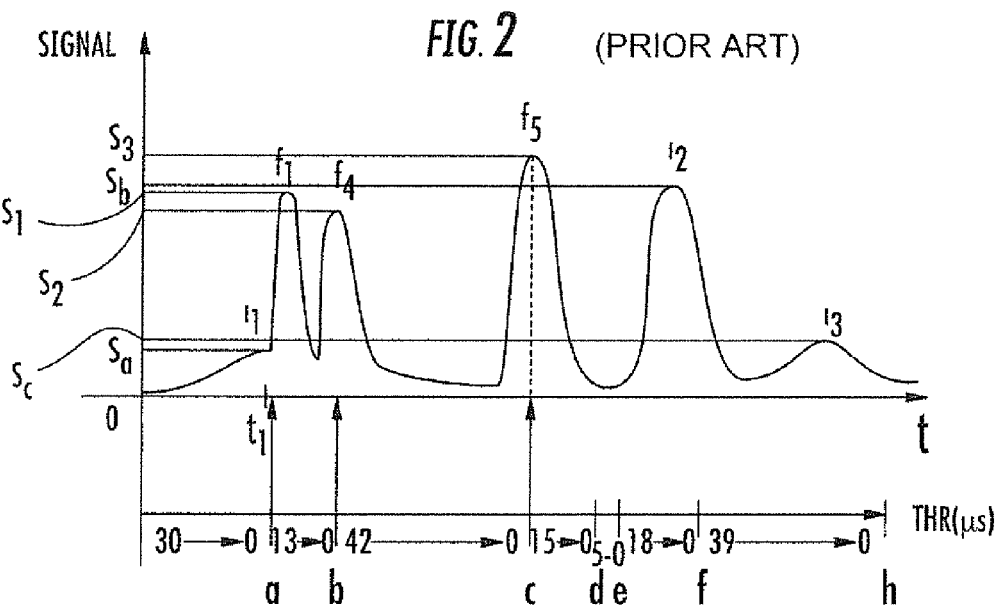
FIG. 3 represents a diagram of the electric signals, emitted by an IC Card during computations involving sensitive data, and noise functions, according to the method of the present invention.

With reference to FIG. 3, electrical signals $s_a$, $s_b$, $s_c$ emitted by an IC Card for the computations of instructions $i_1, i_2, i_3$, are represented as a function of the time t. The computations involve sensitive data, for example a cryptographic key used by instruction $i_2$, to encrypt data. More particularly, the computation of instruction $i_2$ may generate an electric signal $s_b$ different from the signal emitted by the computations of instructions $i_1$ and $i_3$, due to the computational complexity of the cryptographic instruction with respect to the instructions $i_1, i_3$. Thus, in order to de-correlate the electric signal $s_b$ from the sensitive data involved in the instruction $i_2$, further electric signals $s_1, s_2, s_3$ are inserted. Such signals $s_1, s_2, s_3$ are emitted by the IC Card during the computation of noise functions $f_1$, $f_4$, $f_5$ not involving sensitive data, for example inserted between instruction $i_1$ and $i_2$.

According to the method of the invention, each function $f_1$, $f_4$, $f_5$ is triggered by a timer TMR having a time value $t_{rand}$ which is differently reset at each step of executing the functions $f_1$, $f_2$, $f_5$. FIG. 3 schematically represents an execution of the method of the present invention: at time t=0, the timer TMR is set to a value of 30 usec and, after it has counted 30 usec, it triggers the function $f_1$, with the emission from the IC Card of an electrical signal $s_1$, substantially similar to the electric signal $s_b$ emitted for the execution of instruction $i_2$.

Before time a, i.e. when the timer is reset, the IC Card processes another value for the timer TMR, for example 13 usec. Thus, the timer is reset and decreased from 13 usec to 0 (point b), when it may trigger another noise function $f_4$. Then, it is reset by the IC Card to another value of 42 usec, processed by the IC Card. As described above, the timer TMR is again decreased and, in point c, it may trigger a third noise function $f_5$ and it is reset to another value of 15 usec. Before the execution of the instruction $i_2$ involving sensitive data, the timer TMR is reset two other times, respectively at values of 5 usec and 18 usec, but in these cases it does not trigger any noise functions.

More particularly, according to a preferred embodiment, the noise functions may be randomly triggered or not triggered by the timer TMR. In this respect, also between the execution of instruction $i_2$ and $i_3$, the timer is reset to values of 39 usec and it does not trigger a noise function.

Advantageously, if the same computation $i_1$, $i_2$, $i_3$ is described above is repeated a plurality of times, the insertion pattern of noise functions is not repeated, since the values for the timer are different. For instance, repeating the execution of $i_1$, $i_2$, $i_3$, the timer might be set for the first time, i.e. at t=0, to 8 usec, for a second time to 5 msec and for a third time to 50 usec. This means that, differently from the first execution of the computations $i_1$, $i_2$, $i_3$, the timer is reset three times between instruction $i_1$ and $i_2$, allowing an insertion pattern of noise functions completely different from the first execution of the computation $i_1$, $i_2$, $i_3$.

According to an aspect, the execution time $t_m$ of the computation is prolonged as much as possible, within a predetermined time limit $T_{max}$. In this respect, smaller are the different values of the timer TMR, higher are the number of portions in which the computation is divided, due to the insertions of more noise functions. Thus, the method of this invention processes a maximum number $N_{max}$ of insertions of noise function which may be introduced to complete the computation within the predetermined time limit $T_{max}$, another number $N_1$ of insertions of noise function which may be introduced to complete the computation within another predetermined time limit $T_1$, with $T_1 < T_{max}$, and process a lower timer value and an upper timer value to be used for selecting the timer value $t_{rand}$.

In this respect, the $t_{fi}$ the time for executing a noise function $f_i$, a sum of the execution time $f_i$ of all the noise functions is $\Sigma_i t_{fi}$.

$\Sigma_i t_{fi}$ should be such that $$\Sigma_i t_{fi} + t_m < T_{max} \quad (1)$$

i.e the execution time of the computation of $i_1$, $i_2$, $i_3$ with the insertion of noise functions should be less than the predetermined time value $T_{max}$.

If $N_1$ noise functions are executed, the expression (1) may be written as:

$$N_1 * t_f + t_m = T_{max} \quad (2)$$

where $t_f$ is the average execution time of the noise functions, or as:

$$N_1 * t_f + t_m = T_1 \quad (3)$$

where $T_1 < T_{max}$.

From (3), the number of $N_1$ noise functions to be executed to maintain the execution time of the computations together with the insertion of noise function within the predetermined time limit T1, may be calculated as $$N_1 = (T_1 - t_m)/t_f \quad (4)$$

This number $N_1$ also corresponds to the number of portions in which the computation of sensitive date is divided by the insertion of Mi noise functions.

Thus, the average execution time $t_{pmu}$ of said $N_1$ portions is $$t_{pmu} = T_m/N_1 \quad (5)$$

From (5), an upper timer value may be processed inside the IC Card as $$t_{upper} = t_{pmu} * f_{clock},$$

where $f_{clock}$ is a frequency of the clock of the IC Card. A value of the clock frequency is stored inside the IC Card.

Similarly, substituting $T_1$ with $T_{max}$ in (3), a lower timer value may be processed inside the IC Card as:

$$N_{max} * t_f + t_m = T_{max} \quad (3a)$$

From (3a), the number $N_{max}$ of noise functions to be executed to maintain the execution time of the computations together with the insertion of $N_{max}$ noise function within the time limit $T_{max}$ may be calculated as $$N_{max} = (T_{max} - t_m)/t_f \quad (4a)$$

This number $N_{max}$ also corresponds to the number $N_{max}$ of portions in which the computation of sensitive date is divided, due to the insertion of $N_{max}$ noise functions, to stay within the predetermined time limit $T_{max}$.

Thus, the average execution time $t_{pm1}$ of the portions is $$t_{pm1} = T_m/N_{max} \quad (5a)$$

From (5a), a lower timer value may be processed inside the IC Card as $$t_{uower} = t_{pml} * f_{clock},$$

Advantageously, several executions of the computations involving the sensitive data, forced by a possible attack, cannot identify insertion patterns of the noise functions introduced for de-correlation since such functions may be triggered at any time and they do not correspond to any insertion pattern. Moreover, the insertion pattern of noise function after an execution of the entire computation involving the sensitive data is substantially unrepeatable.

Advantageously, the timer values and thus the number of executions of the noise functions within the computation is calculated by the IC Card to comply with ISO standards, maintaining the total execution time of the computation, including the execution time of the noise functions inserted, within the predetermined time limits.

Advantageously, the average execution time $t_{pmu}$ of the portions to be inserted for completing the computations within a predetermined time limit $T_1$, and the upper timer value $t_{upper}$ and the number $N_1$ of executions of noise functions are automatically processed by the IC Card, based on the predetermined time value $T_1$. Also the execution time of the computations $t_m$ and the average execution time $t_f$ of the noise functions are automatically processed by the IC Card.

Advantageously, the average execution time $t_{pml}$ of the portions associated to the lower timer value $t_{lower}$ is processed by dividing the execution time $t_m$ of the computations for a number $N_{max}$ of executions of the noise functions to complete the computations in the predetermined time $T_{max} \geq t_m$, with $T_{max} > T_1$.

That which is claimed is:

1. A method to de-correlate electric signals emitted by an IC Card during computations and sensitive data involved with the computations, the method comprising:
    executing functions introducing respective electric signals, which do not involve the sensitive data;
    each execution of the functions being triggered based upon a timer having a value which is different at each execution of the functions, such that time intervals between executions of the functions are different;
    operating the IC card to determine an upper timer value and a lower timer value to complete the computations involving sensitive data within a desired time limit, with the upper and lower timer values being determined based on a clock frequency that is adjusted based on time stamps received by the IC Card from a handset; and
    randomly selecting the value between the upper and lower timer values at each execution of the functions.

2. A method according to claim 1, wherein the upper timer value and the lower timer value are associated with an average execution time of portions of the computations involving sensitive data included between consecutive executions of the functions.

3. A method according to claim 2, wherein the average execution time of the portions associated with the upper timer value are processed by dividing an execution time of the computations for a number of executions of the functions to complete the computations in a desired time stored in the IC Card.

4. A method according to claim 3, wherein the number of executions of the functions to complete the computations in the desired time is processed by subtracting, from the desired time, the execution time of the computations and dividing a resulting difference with an average execution time of the functions.

5. A method according to claim 2, wherein the average execution time of the portions associated with the lower timer value is processed by dividing an execution time of the computations by a number of executions of the functions to complete the computations in a desired time stored in the IC Card.

6. A method according to claim 2, wherein the upper timer value and the lower timer value are processed, respectively, as $t_{upper} = t_{pmu} * f_{clock}$, and $t_{lower} = t_{pml} * f_{clock}$, wherein $t_{pmu}$ is the average execution time of the portions associated with the upper timer value, $t_{pml}$ is the average execution time of the portions associated with the lower timer value, and $f_{clock}$ is a frequency of a clock of the IC Card.

7. A method according to claim 6, wherein the clock frequency is a fixed value and the upper timer value and the lower timer value are fixed values for the timer.

8. A method according to claim 6, wherein the clock frequency is adjusted as $f_{clk} = (V_2 - V_1 + n_{clk1} - n_{clk2})/(t_{s2} - t_{s1})$, where $t_{s2}, t_{s1}$ are the time stamps received by the IC Card from a handset, $n_{clk1}$ and $n_{clk2}$ are numbers of clock cycles occurring from receipt of the time stamps until, respectively, a start of an internal timer of the IC Card and a reading of a value thereof, and $V_2, V_1$ are values of the internal timer at time $T_1 = t_{s1} + n_{clk1}/f_{clk}$, and $T_2 = t_{s2} + n_{clk2}/f_{clk}$.

9. A method to de-correlate electric signals emitted by an IC Card during computations and sensitive data involved with the computations, the method comprising:
    executing functions introducing respective electric signals, which do not involve the sensitive data;
    each execution of the functions being triggered based upon a timer having a value which is different at each execution of the functions, such that time intervals between executions of the functions are different;
    at each execution of the functions, the value of the timer being randomly selected between an upper timer value and a lower timer value which are determined by the IC Card to complete the computations involving sensitive data within a desired time limit, at least one of the upper timer value and the lower timer value being
        associated with an average execution time of portions of the computations involving sensitive data included between consecutive executions of the functions functions, and
        based on a clock frequency that is adjusted based on time stamps received by the IC Card from a handset.

10. A method according to claim 9, wherein the average execution time of the portions associated with the upper timer value are processed by dividing an execution time of the computations for a number of executions of the functions to complete the computations in a desired time stored in the IC Card.

11. A method according to claim 10, wherein the number of executions of the functions to complete the computations in the desired time is processed by subtracting, from the desired time, the execution time of the computations and dividing a resulting difference with an average execution time of the functions.

12. An IC card comprising:
    a processor configured to perform computations involving sensitive data and to emit electric signals based thereupon; and
    a timer;
    said processor also coupled to said timer and configured to de-correlate the electric signals by
        executing functions introducing respective electric signals, which do not involve the sensitive data,
        each execution of the functions being triggered based upon the timer having a value which is different at each execution of the functions, such that time intervals between executions of the functions are different; and
    said processor is configured to
        determine an upper timer value and a lower timer value to complete the computations involving sensitive data within a desired time limit, with the upper and lower timer values being determined based on a clock frequency that is adjusted based on time stamps received by the IC Card from a handset; and
        randomly selecting the value between the upper and lower timer values at each execution of the functions.

13. An IC Card according to claim 12, wherein said processor is configured such that the upper timer value and the lower timer value are associated with an average execution time of portions of the computations involving sensitive data included between consecutive executions of the functions.

14. An IC Card according to claim 13, wherein said processor is configured such that the average execution time of the portions associated with the upper timer value are processed by dividing an execution time of the computations for a number of executions of the functions to complete the computations in a desired time stored in the IC Card.

15. An IC Card according to claim 14, wherein said processor is configured such that the number of executions of the functions to complete the computations in the desired time is processed by subtracting, from the desired time, the execution time of the computations and dividing a resulting difference with an average execution time of said functions.

16. An IC Card according to claim 14, wherein said processor is configured such that the number of executions of the functions to complete the computations in the desired time is processed by subtracting, from the desired time, the execution time of the computations, and dividing a resulting difference with an average execution time of the functions.

17. An IC Card according to claim 13, wherein said processor is configured such that the average execution time of the portions associated with the lower timer value is processed by dividing an execution time of the computations by a number of executions of the functions to complete the computations in a desired time stored in the IC Card.

* * * * *

UNITED STATES PATENT AND TRADEMARK OFFICE
CERTIFICATE OF CORRECTION

PATENT NO. : 8,934,628 B2  
APPLICATION NO. : 13/339859  
DATED : January 13, 2015  
INVENTOR(S) : Rosario Bosco and Vincenzo Pascariello Page 1 of 1

It is certified that error appears in the above-identified patent and that said Letters Patent is hereby corrected as shown below:

In the Claims

| | |
|---|---|
| Column 7, Line 58 | Delete: "handset, $_{clk1}$" |
| Claim 8 | Insert -- handset, $n_{clk1}$ -- |
| | |
| Column 8, Line 13 | Delete: "functions functions" |
| Claim 9 | Insert -- functions -- |

Signed and Sealed this  
Eleventh Day of August, 2015

Michelle K. Lee  
*Director of the United States Patent and Trademark Office*